US008952906B2

(12) United States Patent
Lee

(10) Patent No.: US 8,952,906 B2
(45) Date of Patent: Feb. 10, 2015

(54) APPARATUS AND METHOD FOR INPUTTING WRITING INFORMATION ACCORDING TO WRITING PATTERN

(75) Inventor: Jae Jun Lee, Seoul (KR)

(73) Assignee: Penandfree Co., Ltd., Seongnam-Si, Gyeonggi-Do (KR)

( * ) Notice: Subject to any disclaimer, the term of this patent is extended or adjusted under 35 U.S.C. 154(b) by 387 days.

(21) Appl. No.: 13/386,249

(22) PCT Filed: Jul. 31, 2009

(86) PCT No.: PCT/KR2009/004311
§ 371 (c)(1),
(2), (4) Date: Jan. 20, 2012

(87) PCT Pub. No.: WO2011/010761
PCT Pub. Date: Jan. 27, 2011

(65) Prior Publication Data
US 2012/0139863 A1 Jun. 7, 2012

(30) Foreign Application Priority Data
Jul. 21, 2009 (KR) .......................... 10-2009-0066206

(51) Int. Cl.
G06F 3/041 (2006.01)
G06F 3/043 (2006.01)
G06F 3/0488 (2013.01)

(52) U.S. Cl.
CPC .............. *G06F 3/043* (2013.01); *G06F 3/0488* (2013.01)
USPC ............................ 345/173; 345/443; 345/179

(58) Field of Classification Search
CPC ............................... G06F 3/0488; G06F 3/043
USPC ..................... 345/173, 179; 178/18.03, 18.05; 715/268
See application file for complete search history.

(56) References Cited

U.S. PATENT DOCUMENTS 5,434,959 A * 7/1995 Von Ehr et al. ............... 345/441
5,557,301 A * 9/1996 D'Aviau de Piolant ...... 345/179
5,594,855 A * 1/1997 Von Ehr et al. ............... 345/442
5,611,036 A * 3/1997 Berend et al. ................. 345/441
6,067,073 A * 5/2000 Rae-Smith et al. ........... 345/589

(Continued)

FOREIGN PATENT DOCUMENTS

KR 10-0297482 B1 5/2001
KR 1020030036289 A 5/2003

(Continued)

OTHER PUBLICATIONS

International Search Report, Application No. PCT/KR2009/004311, dated Aug. 13, 2010.

*Primary Examiner* — Priyank Shah
(74) *Attorney, Agent, or Firm* — Kile Park Reed & Houtteman PLLC

(57) ABSTRACT

Provided are a method and apparatus for inputting handwriting in a digital electronic apparatus. Various patterns defining methods of generating pressure information according to handwriting input are stored in advance, and a user selects a pattern similar to a pattern of the user or selects a desired handwriting pattern to perform the handwriting, so that pressure information is generated according to the handwriting pattern and the handwriting is displaying with a thickness corresponding to the pressure information. Therefore, it is possible to solve a problem of monotonous handwriting input in the related art where only the position is input and the handwriting is output with the same thickness.

15 Claims, 6 Drawing Sheets

(56) References Cited

U.S. PATENT DOCUMENTS

| | | | |
|---|---|---|---|
| 6,600,834 B1* | 7/2003 | Su et al. | 382/187 |
| 6,909,430 B2* | 6/2005 | Dresevic et al. | 345/443 |
| 7,236,180 B2* | 6/2007 | Dresevic et al. | 345/592 |
| 7,352,366 B2* | 4/2008 | Dresevic et al. | 345/179 |
| 7,697,002 B2* | 4/2010 | McCall et al. | 345/467 |
| 2005/0162413 A1* | 7/2005 | Dresevic et al. | 345/179 |
| 2007/0146393 A1* | 6/2007 | Feldman et al. | 345/660 |
| 2008/0180410 A1* | 7/2008 | McCall et al. | 345/179 |

FOREIGN PATENT DOCUMENTS

| | | | |
|---|---|---|---|
| KR | 1020060096208 A | 9/2006 | |
| KR | 10-0651762 B1 | 11/2006 | |
| KR | WO-2008097024 A1 * | 8/2008 | G06F 3/03 |
| KR | 10-0869712 B1 | 11/2008 | |

* cited by examiner (a)          (b)

(a)          (b)

APPARATUS AND METHOD FOR INPUTTING WRITING INFORMATION ACCORDING TO WRITING PATTERN

TECHNICAL FIELD

The present invention relates to a handwriting information inputting apparatus and a handwriting information inputting method, and more particularly, to a handwriting information inputting apparatus and a handwriting information inputting method of estimating a handwriting pressure from a digital handwriting inputting apparatus such as a touch screen and inputting the handwriting pressure together with handwriting position information.

BACKGROUND ART

As electronic apparatuses such as computers and PDAs have been widely used, users have written notes, contacts, or the like on these electronic apparatuses instead of pocket diaries.

Particularly, as portable electronic apparatuses such as tablet PCs and PDAs have been widely spread, users have performed direct handwriting inputting and storing with respect to the portable electronic apparatuses such as tablet PCs and PDAs by using pens or the like instead of keyboards. In addition, the user can perform editing simple pictures or the like as well as the handwriting by using various application programs such as a paint program.

However, in a handwriting input method of the related art, since only a locus connecting the position of the input means is displayed to the user, the handwriting stroke or picture input by the user is displayed by the line having the same thickness. Therefore, when the user performs actual handwriting, there is a problem in that a change in the thickness of letters according to a difference of a pressure of a pen pushing a handwriting surface cannot be represented, so that natural writing feeling cannot be represented.

In order to solve this problem, a pressure sensor may be additionally installed to the user's input means. However, in this case, due to the additional installation of the pressure sensor to the input means, the size of the input means is increased, so that the input means may be inconvenient to use. In addition, since a hardware configuration of the inputting apparatus needs to be changed, so that there is a problem in that costs are increased.

DISCLOSURE

Technical Problem

The present invention is to provide a handwriting inputting method and a handwriting inputting apparatus capable of performing more natural handwriting inputting by generating a pressure value of input handwriting according to a handwriting pattern defined in advance or user's setting and adjusting a handwriting thickness corresponding to the pressure value with respect to inputting of the user's handwriting in an electronic apparatus by using various input means without an additional hardware configuration such as a pressure sensor.

Technical Solution

According to an aspect of the present invention, there is provided a handwriting inputting apparatus including: a position measuring unit which measures a position of an object by which a user inputs handwriting to generate coordinate information; a pattern DB which stores handwriting pressure pattern information which is defined in advance; and a pressure information generating unit which generates virtual handwriting pressure corresponding to the coordinate information according to the handwriting pressure pattern information by using the coordinate information.

In addition, the handwriting inputting apparatus may further include a handwriting information storage unit which stores handwriting information including the coordinate information, time information corresponding to the coordinate information, and pressure information corresponding to the coordinate information.

In addition, the handwriting inputting apparatus may further include a display unit which displays the handwriting at a position corresponding to the coordinate information with a thickness corresponding to the pressure information.

In addition, the position measuring unit may generate the coordinate information by sampling the position of the object in a predetermined time interval, and the handwriting information storage unit may store handwriting information including the coordinate information and pressure information corresponding to the coordinate information.

In addition, the object by which the user input the handwriting may be a signal generating unit which generates a reference signal and an ultrasonic wave signal, and the position measuring unit may be configured to include a reference signal receiving sensor for receiving the reference signal and ultrasonic wave signal receiving sensors which are disposed to be separated from each other by a predetermined distance to generate coordinate information of the signal generating unit by using a difference between a reception time of the reference signal receiving sensor receiving the reference signal generated by the signal generating unit and a reception time of the ultrasonic wave signal receiving sensor receiving the ultrasonic wave signal generated by the signal generating unit.

In addition, the position measuring unit may be a touch screen panel.

In addition, the pattern information may be represented so as to generate a pressure value by allocating different weighting factors according to increasing and decreasing directions of an X or Y coordinate value of the coordinate information.

In addition, the pattern information may be represented so as to generate a high handwriting pressure with respect to one of horizontal and vertical strokes and to generate a low handwriting pressure with respect to the other thereof.

In addition, the pattern information may be represented so that a high pressure is set to a starting portion of a handwriting stroke, and as the handwriting proceeds, the pressure is gradually decreased, or the pattern information may be represented so that a low pressure is set to the starting portion of the handwriting stroke, and as the handwriting proceeds, the pressure is gradually increased.

In addition, the pattern information may be represented so as to generate a pressure value which is inversely proportional to a handwriting speed.

In addition, the pattern information may be represented so as to generate a pressure value which is repetitively increased and decreased at a certain time or distance period.

In addition, the pattern DB may store a plurality of handwriting patterns, and the handwriting inputting apparatus may further include an input unit which receives the handwriting pattern used for generating handwriting information selected by the user and outputs the selected handwriting pattern to the pressure information generating unit. According to another aspect of the present invention, there is provided a handwriting inputting method of inputting handwriting in a handwriting inputting apparatus, including steps of: (a) allowing a user to select a handwriting pressure pattern; (b) measuring a position of an object by which the user inputs the handwriting to generate coordinate information; and (c) reading handwriting pressure pattern information selected by the user from a pattern DB and generating virtual handwriting pressure information corresponding to the coordinate information according to the handwriting pressure pattern information by using the coordinate information.

In addition, the handwriting inputting method may further include a step of (d) storing the coordinate information, time information corresponding to the coordinate information, and the handwriting pressure information in correspondence with each other.

In addition, the handwriting inputting method may further include a step of (e) displaying the handwriting at a position corresponding to the coordinate information with a thickness corresponding to the pressure information.

In addition, in the step (b), the coordinate information may be generated by sampling the position of the object in a predetermined time interval, and in the step (d), handwriting information including the coordinate information and pressure information corresponding to the coordinate information may be stored.

In addition, in the step (b), the coordinate information of a signal generating unit may be generated by using a difference between reception times of a reference signal and an ultrasonic wave signal which are generated by the signal generating unit used by the user to input the handwriting and which are received by the handwriting inputting apparatus.

In addition, the pattern information may be represented so as to generate a pressure value by allocating different weighting factors according to increasing and decreasing directions of an X or Y coordinate value of the coordinate information.

In addition, the pattern information may be represented so as to generate a high handwriting pressure with respect to one of horizontal and vertical strokes and to generate a low handwriting pressure with respect to the other thereof.

In addition, the pattern information may be represented so that a high pressure is set to a starting portion of a handwriting stroke, and as the handwriting proceeds, the pressure is gradually decreased, or the pattern information may be represented so that a low pressure is set to the starting portion of the handwriting stroke, and as the handwriting proceeds, the pressure is gradually increased.

In addition, the pattern information may be represented so as to generate a pressure value which is inversely proportional to a handwriting speed.

In addition, the pattern information may be represented so as to generate a pressure value which is repetitively increased and decreased at a certain time or distance period.

Advantageous Effects

According to the present invention, various patterns defining methods of generating pressure information according to handwriting input are stored in advance, and a user selects a pattern similar to a pattern of the user or selects a desired handwriting pattern to perform the handwriting, so that pressure information is generated according to the handwriting pattern and the handwriting is displaying with a thickness corresponding to the pressure information. Therefore, it is possible to obtain an effect capable of solving a problem of monotonous handwriting input in the related art where only the position is input and the handwriting is output with the same thickness

BEST MODE

Hereinafter, embodiments of the present invention will be described in detail with reference to the accompanying drawings.

Figure 1:
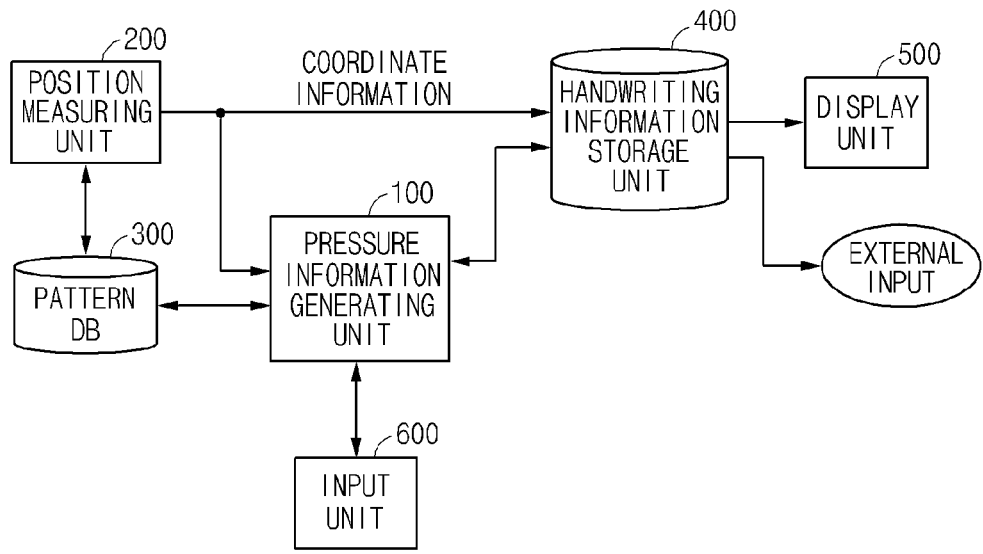
FIG. 1 is a block diagram illustrating a configuration of a handwriting inputting apparatus according to an embodiment of the present invention.

FIG. 1 is a block diagram illustrating a configuration of a handwriting inputting apparatus according to an embodiment of the present invention. Referring to FIG. 1, the handwriting inputting apparatus according to the present invention is basically configured to include a position measuring unit 200, a pressure information generating unit 100, a handwriting information storage unit 400, and a pattern DB 300. In addition, the handwriting inputting apparatus may be configured to further include a display unit 500 and an input unit 600.

First, the position measuring unit 200 measures a position of an object which is moved so as to allow the user to input handwriting to generate coordinate information and outputs the generated coordinate information to the handwriting information storage unit 400 and the pressure information generating unit 100. The position measuring unit 200 outputs time information, this is, information on time when the coordinate information is generated together with the coordinate information. In the case where the coordinate information is generated at a predetermined time period, the time information may be omitted.

The position measuring unit 200 may be implemented as any configuration capable of measuring a position of an object, such as a touch screen, an ultrasonic wave inputting apparatus, a mouse, and a stylus pen without limitation.

In the case where the position measuring unit 200 is implemented as a touch screen, the object on which the user inputs handwriting corresponds to a user's finger, a general pen, an input pen for inputting information on the touch screen, or the like, and the position measuring unit 200 outputs absolute coordinate information of a position of the touch screen which the object is in contact with.

In the case where the position measuring unit 200 is implemented as an ultrasonic wave inputting apparatus, the object on which the user inputs handwriting corresponds to a signal generating unit which generates a reference signal such as an IR signal or an RF signal and an ultrasonic wave signal, and the position measuring unit 200 outputs absolute coordinate in a handwriting space by using a difference between a reception time of the reference signal and a reception time of the ultrasonic wave signal.

Figure 2:
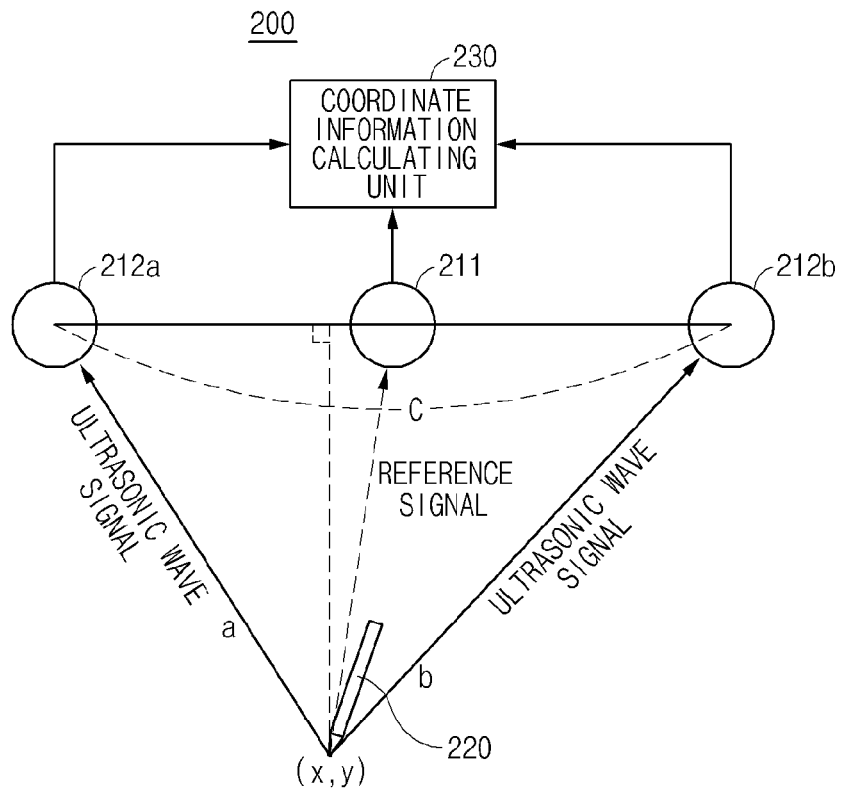
FIG. 2 is a diagram illustrating a method of measuring a coordinate in the case where a position measuring unit is implemented as an ultrasonic wave inputting apparatus.

FIG. 2 is a diagram illustrating a method of measuring a coordinate in the case where the position measuring unit 200 is implemented as an ultrasonic wave inputting apparatus. Referring to FIG. 2, the user performs handwriting at a certain time period by using a signal generating unit 220 which generates the reference signal such as an IR signal or an RF signal and the ultrasonic wave signal simultaneously or by a certain time difference.

On the other hand, the position measuring unit 200 is configured to include a reference signal receiving sensor 211, ultrasonic wave receiving sensors 212a and 212b which are disposed to be separated from each other by a predetermined distance C, and a coordinate information calculating unit 230 which calculates a coordinate of the signal generating unit by using a difference between the reception time of the reference signal and the reception time of each ultrasonic wave signal in each ultrasonic wave receiving sensor.

The coordinate (x, y) of the signal generating unit 220 can be obtained by solving the following Equation 1 with respect to x and y.

$$a^2 = x^2 + y^2$$
$$b^2 = (c-x)^2 + y^2 \quad \text{[Equation 1]}$$

Since the IF signal or the RF signal as a reference signal propagates at the speed of light, it is considered that the reference signal is received by the reference signal receiving sensor 211 at the same time when the reference signal is generated by the signal generating unit 220. Therefore, in Equation 1, the distances a and b can obtained by multiplying a difference between the reception time of the reference signal and the reception time of each of the ultrasonic wave signals received by the left and right ultrasonic wave sensors 212a and 212b with the speed of sound, and the distance c has a predetermined value. Accordingly, by inserting the values of a, b, and c into Equation 1 and solving Equation 1 with respect to x and y, the coordinate (x, y) can be obtained.

On the other hand, in the case where the position measuring unit 200 is implemented as a general inputting apparatus such as a mouse, relative coordinate information of the position rather than the absolute coordinate information may be input.

The pressure information generating unit 100 generates a virtual handwriting pressure value (pressure information) according to the coordinate information input from the position measuring unit 200 and the pattern information stored in the pattern DB 300.

As described above, in order to implement natural handwriting inputting, it is necessary to adjust a thickness of a handwriting stroke according to the handwriting pressure of the user. However, like the method using a touch screen or an ultrasonic wave signal, in the case where handwriting is input in a digital manner, if a separate pressure sensor is not installed, the information on the handwriting pressure cannot be obtained, and thus, the thickness of the handwriting stroke cannot be adjusted according to the handwriting state of the user.

According to the present invention, the handwriting pressure value is generated according to a predetermined handwriting pattern to be stored as handwriting information or to be provided to an application program. In general, if the handwriting pressure is increased during handwriting, the thickness is proportionally increased. Therefore, it should be noted that the handwriting pressure is used as the same meaning as the handwriting thickness in the present invention.

The handwriting information storage unit 400 stores the coordinate information and time information (omitted in the case where the coordinate information is generated at a certain time period) input from the position measuring unit 200 and the pressure information input from the pressure information generating unit 100 in correspondence with each other to output handwriting information including the stored coordinate information and pressure information to the display unit 500 or to output the handwriting information as input values of other application programs, or the like.

In addition, in some embodiments of the present invention, the handwriting information storage unit 400 may be omitted. In this case, the coordinate information and time information (omitted in the case where the coordinate information is generated at a certain time period) input from the position measuring unit 200 and the pressure information input from the pressure information generating unit 100 are output to the display unit 500 or as input values of other application programs, or the like in real time.

The pattern DB 300 stores a plurality of pieces of predetermined pattern information. The pattern information is information on a pattern defining a rule of generating pressure information according to a change of position where the user performs handwriting, that is, a change of coordinate information. Examples of the patterns will be described with reference to FIGS. 3 to 7.

On the other hand, the display unit 500 displays the handwriting information input from the handwriting information storage unit 400 to the user. The display unit 500 displays the handwriting of the user at the position on the display unit 500 corresponding to the coordinate information included in the handwriting information with the thickness corresponding to the pressure information. In some embodiments, instead of inputting the handwriting information stored in the handwriting information storage unit 400, the coordinate information and the pressure information may be input from the position measuring unit 200 and the pressure information generating unit 100, respectively, in real time.

The input unit 600 is input with pattern selection information and pattern setting information of the selected pattern from the user and outputs the pattern selection information and the pattern setting information to the pressure information generating unit 100. As described later, the handwriting information generating pattern according to the present invention defines the pressure information in different manners according to a plurality of different rules, so that the user can select the handwriting pattern of the to-be-input handwriting information according to the actual handwriting habit of the user or the to-be-represented handwriting manners of the user.

FIGS. 3 to 7 are views illustrating examples of displaying handwriting information generated according to handwriting information generating patterns of the present invention stored in pattern DB 300. As described above, according to the present invention, a handwriting pressure value of the user is generated according to various predetermined handwriting information input patterns, and the handwriting information is displayed to the user.

Figure 3:
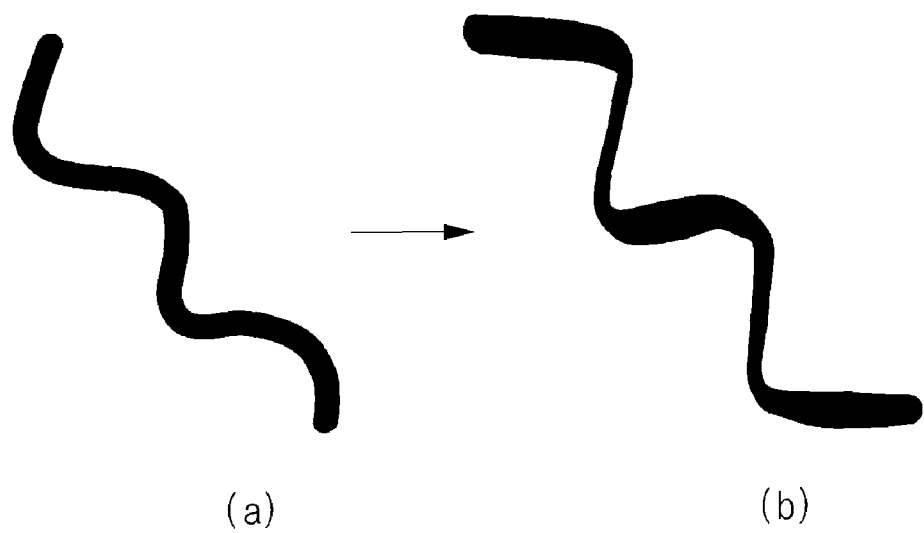
FIGS. 3 to 7 are views illustrating examples of displaying handwriting information generated according to handwriting information generating patterns of the present invention stored in pattern DB.

First, in a pattern (referred to as a first pattern) illustrated in FIG. 3, a horizontal stroke and a vertical stroke are distinguished from each other, and the pressure weighting factor allocated to the horizontal stroke (or vertical stroke) is higher than that of the vertical stroke (or horizontal stroke). According to a conventional handwriting manner illustrated in (a) of FIG. 3, the same handwriting pressure is allocated without distinguishing between the horizontal stroke and the vertical stroke, so that the horizontal stroke and the vertical stroke are represented with the same thickness. However, according to the first pattern of the present invention illustrated in (b) of FIG. 3, it can be understood that, the handwriting pressure allocated to the horizontal stroke is set to be higher than that of the vertical stroke, so that the horizontal stroke is represented to be thicker than the vertical stroke.

Figure 4:
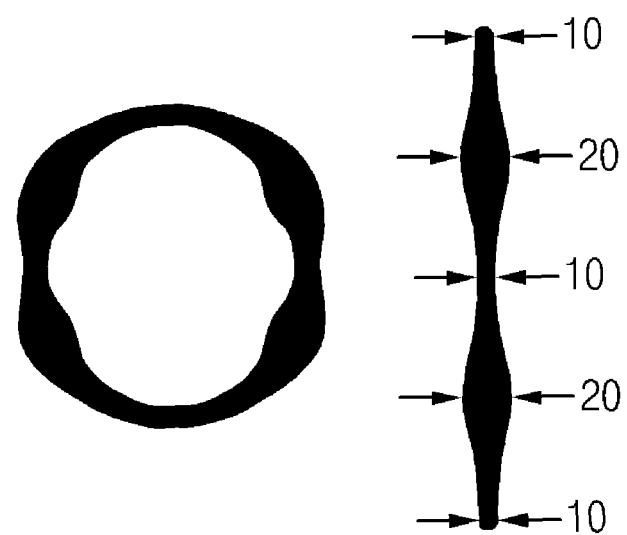

In a pattern (referred to as a second pattern) illustrated in FIG. 4, the pressure value is repetitively increased and decreased at a certain time period or distance period irrespective of a handwriting direction. In the second pattern of the example illustrated in FIG. 4, a minimum value (10 in the example of FIG. 4) and a maximum value (20 in the example of FIG. 4) of the magnitude of the pressure which is to be repetitively increased and decreased are set in advance. As illustrated in FIG. 4, while the user performs handwriting, the pressure value is gradually increased from the minimum value of 10 at a certain time period or distance period, and the pressure value reaches the maximum value of 20 at the time point or spatial point corresponding to a half of the time period or distance period. Next, the pressure value is decreased, and the pressure value reaches the minimum value of 10 at the time point or spatial point corresponding to one time period or distance period. After that, the pressure is increased again. In this manner, the pressure is repetitively increased and decreased.

Figure 5:
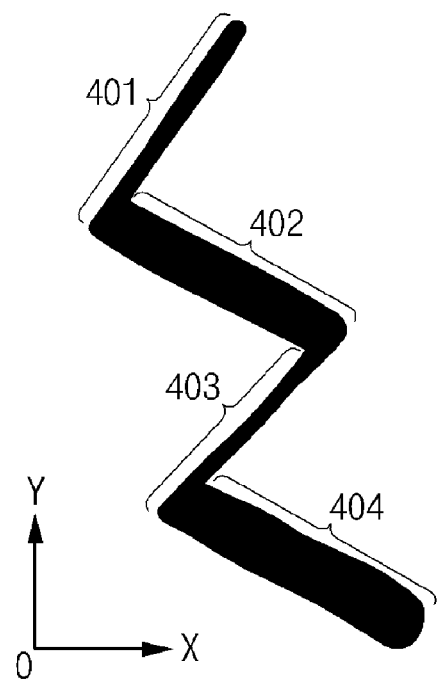

In a pattern (referred to as a third pattern) illustrated in FIG. 5, pressure values are defined to be generated so that different weighting factors are to be allocated to the increasing or decreasing direction of the coordinate values in the X or Y axis. FIG. 5 illustrates an example where weighting factors are allocated so that a higher pressure value is generated in the increasing direction of the X axis.

As illustrated in FIG. 5, in sections 401 and 403 where the coordinate value in the coordinate information is decreased in the X axis direction, the handwriting pressures are generated in the same manner as the convention method; and in sections 402 and 404 where the coordinate value is increased in the X axis direction, the handwriting pressures are set to be higher than those of the section 401 and 403 so as to be represented to be thicker. Although FIG. 5 illustrates the example where the pressure value is changed in the X axis direction, the same pattern can also be applied to the example where the pressure value is changed in the Y axis direction.

Figure 6:
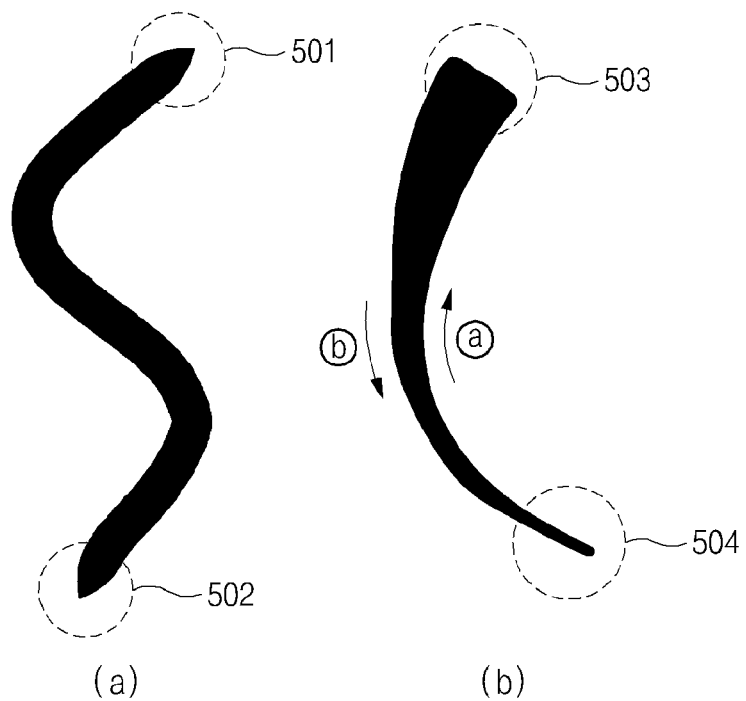

In a pattern (referred to as a fourth pattern) illustrated in FIG. 6, the pressure values of the starting and ending portions of a handwriting stroke are generated according to predetermined values.

(a) of FIG. 6 illustrates a pattern where, at the starting portion of the handwriting stroke, the pressure value is gradually increased (the thickness is gradually increased); during a certain section, the pressure value (thickness) is maintained to be constant; and at the ending portion, the pressure value (thickness) is gradually decreased.

In addition, (b) of FIG. 6 illustrates a pattern where, at the starting portion of the handwriting stroke, the pressure value is set to be the maximum value; and as it goes to the ending portion, the pressure value is gradually decreased (the case of making a stroke in the ⓑ direction), and a pattern where, at the starting portion of the handwriting stroke, the pressure value is set to be the minimum value; and as it goes to the ending portion, the pressure value is gradually increased (the case of making a stroke in the ⓐ direction).

Figure 7:
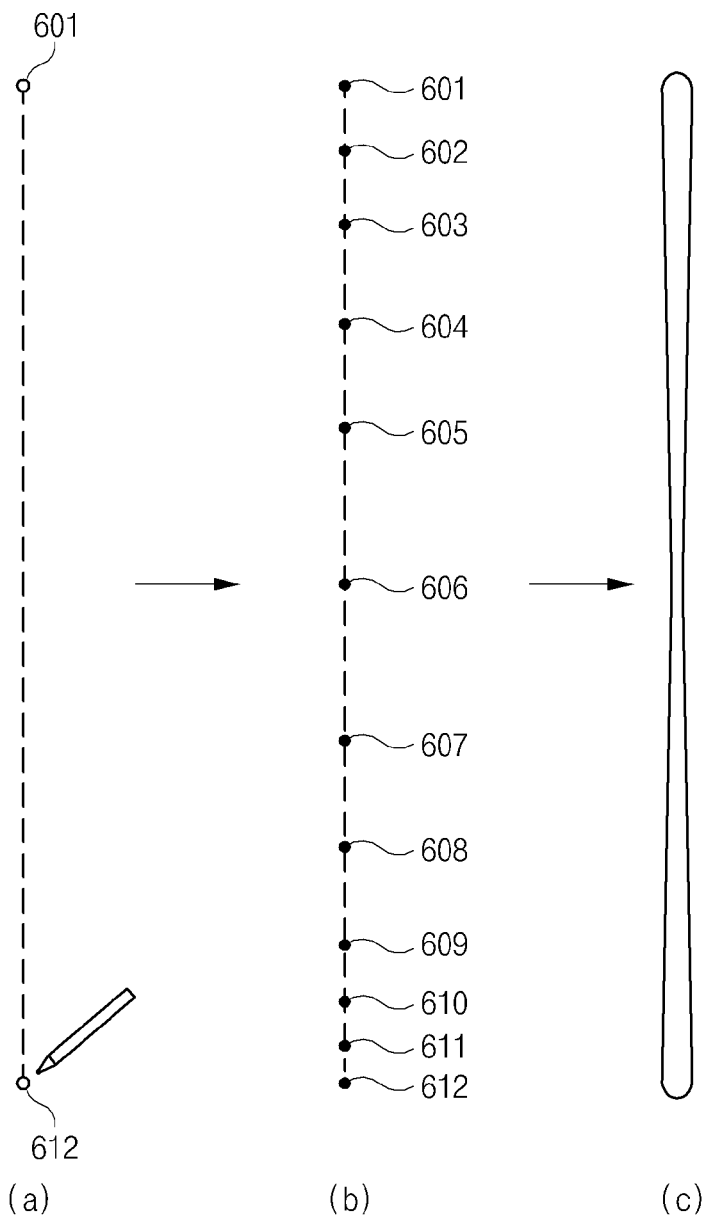

In a pattern (referred to as a fifth pattern) illustrated in FIG. 7, the pressure value is generated according to a handwriting speed of the user. The fifth pattern is contrived by taking into consideration that, with respect to general handwriting, if the handwriting speed becomes high, the handwriting pressure applied to the pen is decreased, so that the handwriting thickness is decreased; and if the handwriting speed becomes low, the handwriting pressure applied to the pen is increased, so that the handwriting thickness is increased.

The property of the general handwriting is applied to a digital handwriting input method. If the user performs handwriting from the spatial point 601 to the spatial point 612 as illustrated in (a) of FIG. 7, the handwriting stroke is sampled at a certain time interval as illustrated in (b) of FIG. 7 to measure a distance between the sampled coordinates 601 to 602, so that the handwriting speed of each coordinate interval is calculated. Since the coordinates 601 to 802 are sampled at a constant time interval, the handwriting speed is proportional to the distance between the coordinates.

As illustrated in (c) of FIG. 7, in the fifth pattern, the handwriting pressure information (handwriting thickness information) is generated so that the handwriting pressure is inversely proportional to the handwriting speed (distance between the coordinates). Therefore, in the starting and ending portions of the handwriting stroke where the handwriting speed is low, thick handwriting with a high handwriting pressure is input; and in the section where the handwriting speed is high, thin handwriting with a low handwriting pressure is input.

On the other hand, the fourth and fifth patterns, in order to complete the pressure information, it is necessary to identify the ending portion of the handwriting stroke. Therefore, in the case where the handwriting pressure information is generated according to the fourth or fifth pattern, the handwriting information storage unit 400 also functions as a buffer. If the coordinate information is not input from the position measuring unit 200 during a certain time after the pressure information generating unit 100 stores the pressure information (thickness information) generated in real time to the handwriting information storage unit 400, it is determined that the handwriting stroke is ended, and the pressure information corresponding to the ending portion of the handwriting stroke is corrected according to the pattern information and output to the handwriting information storage unit 400. The corrected pressure information stored in the handwriting information storage unit 400 is output to the display unit 500 or transferred to an external electronic apparatus or an application program.

Figure 8:
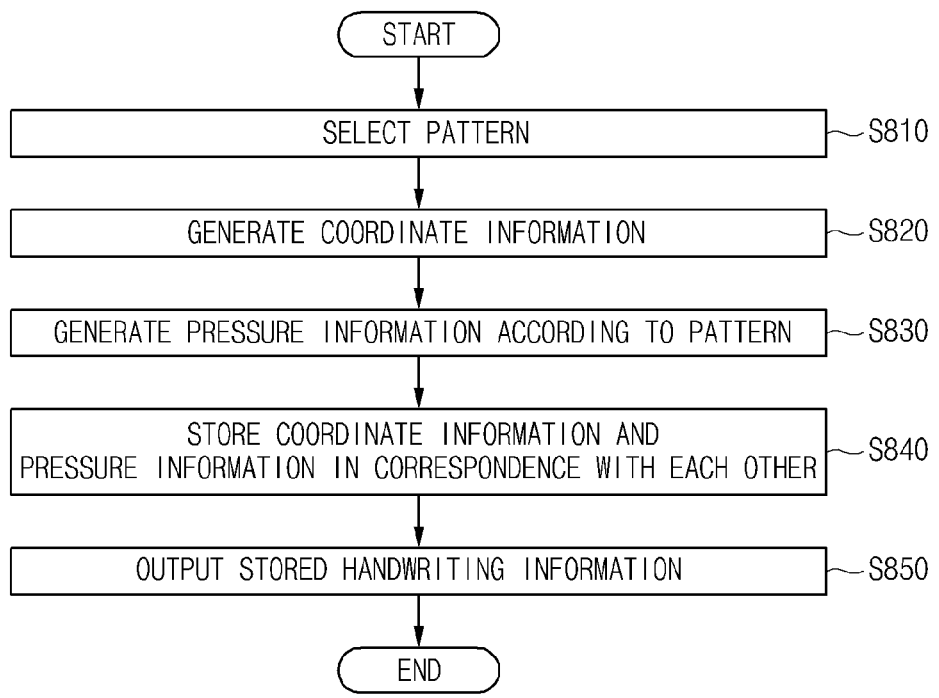
FIG. 8 is a flowchart for describing a handwriting inputting method according to an embodiment of the present invention.

FIG. 8 is a flowchart for describing a handwriting inputting method according to an embodiment of the present invention. The handwriting inputting method according to the present invention will be described with reference to FIG. 8. First, a user selects a pattern which is to be used for inputting handwriting of the user in advance (S810). The pattern selection may be performed by selecting one among patterns which are defined in advance. Otherwise, the user may perform the pattern selection by directly modifying a portion of the pattern which is defined in advance. In addition, the user may store a pattern which is not defined in the pattern DB 300 in advance and, after that, directly select the pattern. In addition, while selecting the pattern, the user may input the setting values of the pattern.

For example, in Step S810, in the case where the user selects the aforementioned first pattern, the user may also select whether the weighting factor is allocated to the horizontal stroke or the vertical stroke.

In addition, in Step S810, in the case where the user selects the aforementioned second pattern, the user may also select the maximum and minimum values of the pressure value which is repetitively increased and decreased. In addition, the user may also set the time period or the distance period.

In addition, in Step S810, in the case where the user selects the aforementioned third pattern, the user may also select whether the weighting factor is allocated with respect to a change in the X or Y axis direction. In addition, the user may also select whether the weighting factor is allocated with respect to the increasing or decreasing direction of the coordinate value in the selected axis direction.

In addition, in Step S810, in the case where the user selects the aforementioned fourth pattern, the user may also input the setting value with respect to the starting and ending portions of the handwriting stroke. For example, in the case where the user selects the pattern corresponding to (a) of FIG. 6, the user may also select the lengths of the starting and ending portions where the pressure value is gradually increased or decreased and a degree of the change (for example, the pressure setting value in each time or distance section).

In addition, in the case where the user selects the pattern corresponding to (b) of FIG. 6, the user may set the pressure of the starting portion of the handwriting stroke to be high and also set an increasing rate of the pressure. In addition, the user may set the pressure of the starting portion of the handwriting stroke to be low and also set a decreasing rate of the pressure.

In addition, in Step S810, in the case where the user selects the aforementioned fifth pattern, the user may directly set a decreasing rate of the pressure according to the handwriting speed.

When the user selects the pattern and performs handwriting, the position measuring unit 200 generates the coordinate information of the object (a finger, a pen, or the like in contact with the aforementioned signal generating unit or touch screen) by which the user performs the handwriting (S820).

The pressure information generating unit 100 which receives the coordinate information searches for the pattern selected by the user in the pattern DB 300 and generates pressure information according to the pattern selected by the user (S830).

Figure 9:
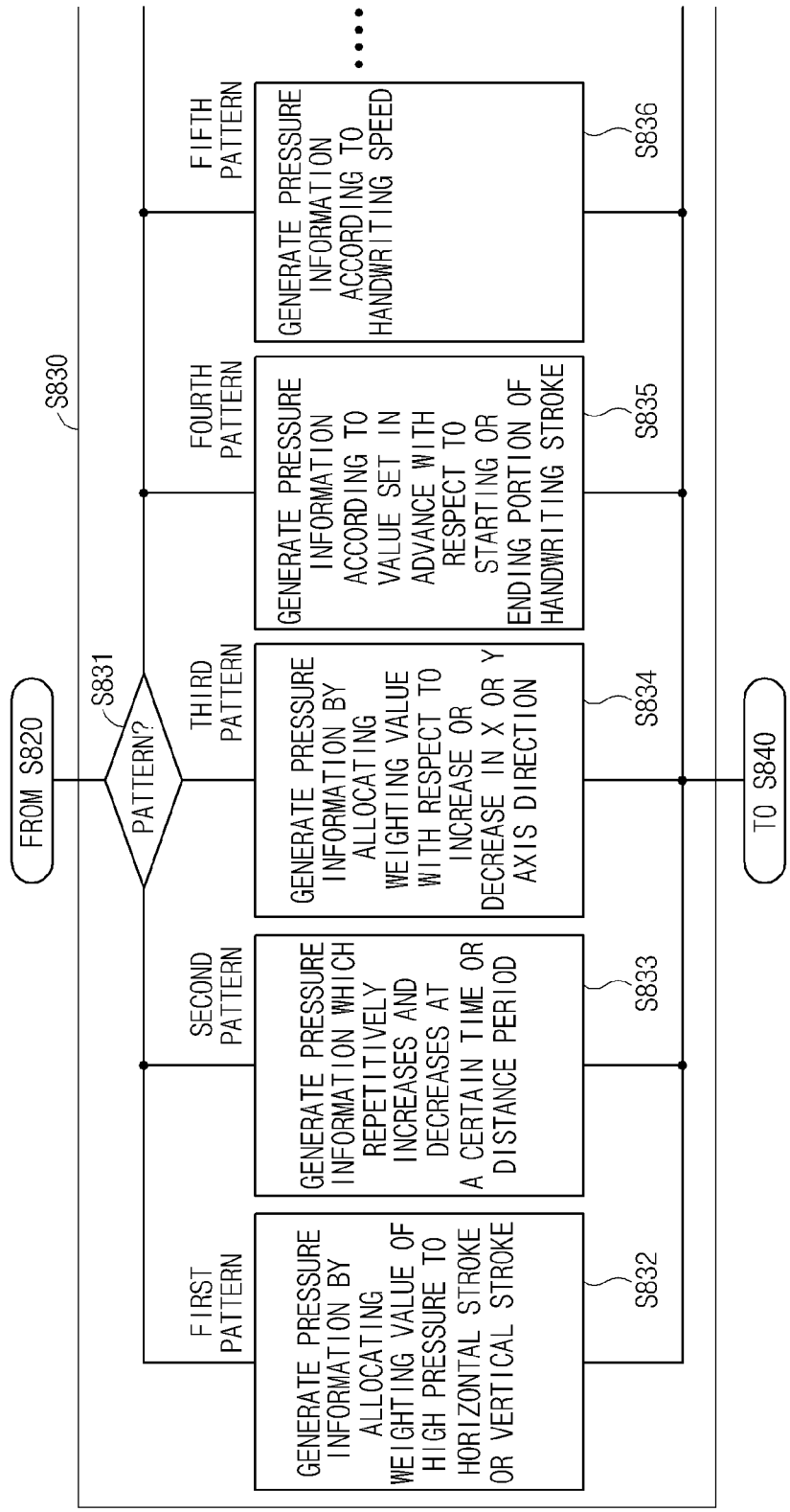
FIG. 9 is a flowchart for describing Step S830 of FIG. 8 in detail.

FIG. 9 is a flowchart for describing Step S830 of FIG. 8 in detail. Referring to FIG. 9, the pressure information generating unit 100 checks the pattern selected by the user (S831), searches for the pattern selected by the user in the pattern DB 300 and generates the pressure information according to the pattern selected by the user and the setting information set by the user with respect to each pattern (S832 to S836).

Among the examples of the aforementioned patterns, in the case where the user selects the first pattern, a high pressure weighting factor is allocated to the horizontal stroke or the vertical stroke according to the information set by the user to generate the pressure information (S832).

In the case where the user selects the second pattern, the pressure information which is repetitively increased or decreased in a certain time or distance period according to the information set by the user is generated (S833).

In the case where the user selects the third pattern, the pressure information is generated by setting a high pressure weighting factor to the increasing or decreasing direction of the coordinate in the X or Y axis direction according to the information set by the user (S834).

In the case where the user selects the fourth pattern, the pressure information is generated according to the pattern stored in advance in the pattern DB 300 or the pattern set by the user with respect to the starting and ending portions of the handwriting stroke (S835).

In the case where the user selects the fifth pattern, pressure information generating unit 100 generates the pressure information which is inversely proportional to the handwriting speed according to the handwriting speed (S836).

Since the process of generating the pressure information according to the first to fifth patterns is described above with reference to FIGS. 3 to 7, the detailed description there is omitted. Besides the aforementioned first to fifth patterns, various patterns may also be set.

Hereinafter, the handwriting information inputting method and apparatus according to the embodiments of the present invention are described. In the aforementioned embodiments of the present invention, although the methods of inputting the handwriting according to the five patterns are exemplified, the present invention may be applied to various patterns beside the aforementioned five patterns. It should be noted that the aforementioned patterns themselves are not the technical features of the present invention. The technical features of the present invention are to allow the user to directly select the patterns and to input a desired style of handwriting information.

The information inputting method according to the present invention can also be embodied as computer readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves (such as data transmission through the Internet). The computer-readable recording medium can also be distributed over network coupled computer systems so that the computer readable code is stored and executed in a distributed fashion.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A handwriting inputting apparatus comprising:
a position measuring unit which measures a position of an object by which a user inputs handwriting to generate coordinate information;
a pattern DB which stores handwriting pressure pattern information which is defined in advance;
a pressure information generating unit which generates virtual handwriting pressure corresponding to the coordinate information according to the handwriting pressure pattern information selected by the user by using the coordinate information; and
an input unit which receives the handwriting pattern used for generating handwriting information selected by the user and outputs the selected handwriting pattern to the pressure information generating unit;
wherein the plurality of handwriting pressure patterns include a 1st pattern which is represented so as to generate a high handwriting pressure with respect to one of horizontal and vertical strokes and to generate a low handwriting pressure with respect to the other thereof, a 3rd pattern which is represented so as to generate a pressure value by allocating different weighting factors according to increasing and decreasing directions of an X or Y coordinate value of the coordinate information, and a 4th pattern which is represented so that a high pressure is set to a starting portion of a handwriting stroke, and as the handwriting proceeds, the pressure is gradually decreased, or wherein the pattern information is represented so that a low pressure is set to the starting portion of the handwriting stroke, and as the handwriting proceeds, the pressure is gradually increased.

2. The handwriting inputting apparatus according to claim 1, further comprising a handwriting information storage unit which stores handwriting information including the coordinate information, time information corresponding to the coordinate information, and pressure information corresponding to the coordinate information.

3. The handwriting inputting apparatus according to claim 1, further comprising a display unit which displays the handwriting at a position corresponding to the coordinate information with a thickness corresponding to the pressure information.

4. The handwriting inputting apparatus according to claim 2, wherein the position measuring unit generates the coordinate information by sampling the position of the object in a predetermined time interval, and wherein the handwriting information storage unit stores handwriting information including the coordinate information and pressure information corresponding to the coordinate information.

5. The handwriting inputting apparatus according to claim 1, wherein the object by which the user input the handwriting is a signal generating unit which
generates a reference signal and an ultrasonic wave signal, and wherein the position measuring unit is configured to include a reference signal receiving sensor for receiving the reference signal and ultrasonic wave signal receiving sensors which are
disposed to be separated from each other by a predetermined distance to generate coordinate information of the signal generating unit by using a difference between a reception time of the reference signal receiving sensor receiving the reference signal generated by the signal generating unit and a reception time of the ultrasonic wave signal receiving sensor receiving the ultrasonic wave signal generated by the signal generating unit.

6. The handwriting inputting apparatus according to claim 1, wherein the position measuring unit is a touch screen panel.

7. The handwriting inputting apparatus according to claim 1, wherein the plurality of handwriting pressure patterns further includes a $5^{th}$ pattern which is represented so as to generate a pressure value which is inversely proportional to a handwriting speed.

8. The handwriting inputting apparatus according to claim 1, wherein the plurality of handwriting pressure patterns further includes a $2^{nd}$ pattern which is represented so as to generate a pressure value which is repetitively increased and decreased at a certain time or distance period.

9. A handwriting inputting method of inputting handwriting in a handwriting inputting apparatus, comprising steps of:
(a) allowing a user to select a handwriting pressure pattern among a plurality of handwriting pressure patterns stored in a pattern database;
(b) measuring a position of an object by which the user inputs the handwriting to generate coordinate information; and
(c) reading handwriting pressure pattern information selected by the user from the pattern database and generating virtual handwriting pressure information corresponding to the coordinate information according to the handwriting pressure pattern information by using the coordinate information;
wherein the plurality of handwriting pressure patterns include a 1st pattern which is represented so as to generate a high handwriting pressure with respect to one of horizontal and vertical strokes and to generate a low handwriting pressure with respect to the other thereof, a 3rd pattern which is represented so as to generate a pressure value by allocating different weighting factors according to increasing and decreasing directions of an X or Y coordinate value of the coordinate information, and a 4th pattern which is represented so that a high pressure is set to a starting portion of a handwriting stroke, and as the handwriting proceeds, the pressure is gradually decreased, or wherein the pattern information is represented so that a low pressure is set to the starting portion of the handwriting stroke, and as the handwriting proceeds, the pressure is gradually increased.

10. The handwriting inputting method according to claim 9, further comprising a step of (d) storing the coordinate information, time information corresponding to the coordinate information, and the handwriting pressure information in correspondence with each other.

11. The handwriting inputting method according to claim 9, further comprising a step of (e) displaying the handwriting at a position corresponding to the coordinate information with a thickness corresponding to the pressure information.

12. The handwriting inputting method according to claim 10,
wherein in the step (b), the coordinate information is generated by sampling the position of the object in a predetermined time interval, and wherein in the step (d), handwriting information including the coordinate information and pressure information corresponding to the coordinate information is stored.

13. The handwriting inputting method according to claim 9, wherein in the step (b), the coordinate information of a signal generating unit is generated by using a difference between reception times of a reference signal and an ultrasonic wave signal which are generated by the signal generating unit used by the user to input the handwriting and which are received by the handwriting inputting apparatus.

14. The handwriting inputting method according to claim 9, wherein the plurality of handwriting pressure patterns further includes a $5^{th}$ pattern which is represented so as to generate a pressure value which is inversely proportional to a handwriting speed.

15. The handwriting inputting method according to claim 9, wherein the plurality of handwriting pressure patterns further includes a $2^{nd}$ pattern which is represented so as to generate a pressure value which is repetitively increased and decreased at a certain time or distance period.

* * * * *